United States Patent [19]

Sato et al.

[11] 4,420,593

[45] * Dec. 13, 1983

[54] PROCESS FOR PRODUCING α-OLEFIN POLYMERS

[75] Inventors: Akihiro Sato, Chibaken; Kazutsune Kikuta, Ichiharashi; Kenji Matsuda, Ichiharashi; Toshihiro Uwai, Ichiharashi; Tohru Hanari, Ichiharashi, all of Japan

[73] Assignee: Chisso Corporation, Osaka, Japan

[*] Notice: The portion of the term of this patent subsequent to Jan. 5, 1999 has been disclaimed.

[21] Appl. No.: 306,228

[22] Filed: Sep. 28, 1981

[30] Foreign Application Priority Data

Sep. 29, 1980 [JP] Japan ............................... 55-134235

[51] Int. Cl.³ .................................................. C08F 4/66
[52] U.S. Cl. ................................... 526/128; 526/139; 526/140; 526/141; 526/142
[58] Field of Search ............... 526/139, 140, 141, 142, 526/128

[56] References Cited

U.S. PATENT DOCUMENTS 4,136,243  1/1979  Appleyard .......................... 526/139
4,187,385  2/1980  Iwao .................................. 526/139
4,210,729  7/1980  Hermans ........................... 526/142
4,210,738  7/1980  Hermans ........................... 526/139
4,217,432  8/1980  Shiga ................................ 526/142
4,295,991 10/1981  Wristers ............................ 526/140
4,304,890 12/1981  Suzuki .............................. 526/140
4,309,521  1/1982  Sato ................................. 526/139

*Primary Examiner*—Paul R. Michl
*Attorney, Agent, or Firm*—Fred Philpitt

[57] ABSTRACT

A process for producing α-olefin polymers with a controlled stereoregularity and with a higher yield is provided, which process comprises: combining a $TiCl_3$-containing composition obtained by reducing $TiCl_4$, with an organoaluminum compound; thereafter subjecting the composition to a polymerization treatment with an α-olefin; before, during or after the polymerization treatment, adding an electron donor or/and an electron acceptor or a reaction product of these two; as well as adding a reaction product of a trialkylaluminum with an electron donor having a specified molar ratio of the electron donor to the trialkylaluminum selected in the range of 0.01 to 5; and polymerizing an α-olefin in the presence of the resulting preactivated catalyst.

33 Claims, No Drawings

PROCESS FOR PRODUCING α-OLEFIN POLYMERS

BACKGROUND OF THE INVENTION

1. Field of the Invention

This invention relates to a process for producing α-olefin polymers and more particularly it relates to a process for producing α-olefin polymers with a controlled stereoregularity and with a higher yield.

2. Description of the Prior Art

It is well known that α-olefins are polymerized by means of the so-called Ziegler-Natta catalysts consisting of a compound of metals of Groups IV–VI of the Periodic Table and an organometallic compound of metals of Groups I~III of the Table, including those modified by adding an electron donor, etc. It is also known that propylene or the like is subjected to stereoregular polymerization using particularly titanium trichloride-containing compositions among the Ziegler-Natta catalysts (e.g. Japanese patent publication No.Sho 32-10596, etc.). In this case, the stereoregularity of the resulting α-olefin polymers has heretofore depended on titanium trichloride-containing compositions or catalyst components having modifiers such as electron donors incorporated therein and polymerization conditions, and it has been impossible to optionally control the stereoregularity of homopolymers.

If the stereoregularity of polypropylene is expressed by the ratio of absorbances at 995 cm$^{-1}$ and 974 cm$^{-1}$ (this ratio will hereinafter be often expressed by "IR-$\tau$"; see J. P. Luongo, Journal of Applied Polymer Science, 3, 302 (1960)), values of IR-$\tau$ of polymers obtained using titanium trichloride-containing compositions have been usually in the range of 0.93 to 0.95. Processes for controlling such IR-$\tau$ values have been carried out by varying the polymerization temperature or adding an additive or copolymerizing propylene with another α-olefin as a comonomer. For example, processes for reducing the IR-$\tau$ values down to about 0.83 to 0.93 in order to reduce the toughness of polymers and elevate the impact strength thereof, have been carried out by elevating the polymerization temperature or adding an additive such as trialkylaluminums or copolymerizing propylene with a comonomer such as ethylene, butene-1. However, such prior art has had a drawback of byproducing a large amount of atactic polymer, resulting in great reduction in the toughness of the resulting polymer, decrease in the tensile strength thereof or a product having a sticky surface to thereby degrade the physical properties of the product. Thus it has been necessary to remove increased atactic polypropylene. As a result, it has been necessary to further install equipments for removing atactic polymer and treating the thus removed polymer e.g. by combustion treatment, resulting in an inferior polypropylene yield and an increase in the polymer production cost.

Further, even when the stereoregularity of polybutene-1 has been given in terms of the X-ray crystallinity according to conventional method, it has so far been impossible to optionally control the stereoregularity.

If it is possible to utilize such a catalyst that when its catalyst components can be varied by a simple operation in the catalyst preparation, such a variation varies the stereoregularity of the resulting polymer, then it becomes possible to produce the polymer by controlling the stereoregularity; and by employing such a catalyst, it becomes easy to produce various polymers which are different in the physical properties such as toughness, stretching characteristics, etc., by the use of the same plant, and this is advantageous in the effective use of plants and also in broadening the application fields of polymers.

The present inventors have made studies on titanium trichloride-containing compositions defined in the present invention, and as a result have found that in the preactivation (i.e. preliminary activation) of the compositions, a reaction product of a trialkylaluminum with an electron donor is added and also the molar ratio of these two reaction raw materials are varied in the formation reaction thereof, whereby it is possible to control the stereoregularity (IR-$\tau$) of polymers finally obtained, and have attained the present invention.

The object of the present invention is to provide a process for producing α-olefin polymers which is easy to control the stereoregularity of polymers finally obtained, without any increase in the amount of atactic polymers.

SUMMARY OF THE INVENTION

The present invention resides briefly in:

A process for producing α-olefin polymers which comprises:

combining a titanium trichloride-containing composition obtained by reducing titanium tetrachloride, with an organoaluminum compound;

thereafter subjecting the composition to a polymerization treatment with an α-olefin;

before, during or after the polymerization treatment, adding either one of an electron donor, an electron acceptor, an electron donor plus an electron acceptor or a reaction product of an electron donor with an electron acceptor; as well as adding a reaction product of a trialkylaluminum with an electron donor (hereinafter abbreviated to reaction product (H)), having a specified molar ratio of the electron donor to the trialkylaluminum selected in the range of 0.01 to 5; and polymerizing an α-olefin in the presence of the resulting preactivated catalyst.

DESCRIPTION OF PREFERRED EMBODIMENTS

The preparation of the catalyst used in the present invention will be described.

The titanium trichloride-containing composition used in the present invention can be prepared according to various processes. Main preparation examples thereof are as follows:

(1) a process wherein TiCl$_4$ is reduced with a metal of group IIa or IIIb of the Periodic Table, followed by milling or heat treatment (the titanium trichloride-containing composition obtained according to this process will hereinafter be referred to as solid product (I); similarly solid products obtained below will be expressed by the succeeding numbers each step);

(2) a process wherein the solid product (I) is reacted with an electron donor (C) or/and an electron acceptor (D) or a reaction product (G) of (C) with (D) (solid product (II);

(3) a process wherein TiCl$_4$ is reduced with an organoaluminum compound alone or its reaction product with an electron donor (solid product (III);

(4) a process wherein the solid product (III) is reacted with an electron donor or/and an electron acceptor or a reaction product (G) of these two (solid product (IV));

(5) a process wherein a reaction product of TiCl$_4$ with an electron donor is reduced with an organoaluminum compound alone or its reaction product with an electron donor (solid product (V));

(6) a process wherein the solid product (V) is reacted with an electron donor or/and an electron acceptor or a reaction product (G) of these two (solid product (VI)); and (7) a process wherein the above solid product (I) or (III) or (V) is subjected to a polymerization treatment with an α-olefin and the resulting product is reacted with an electron donor or/and an electron acceptor or a reaction product (G) of these two (solid product (VII)).

The above processes will be further described in details.

The solid product (I) is prepared as follows:

0.1 to 10 L of a solvent is added to 1 mol of TiCl$_4$ (A), and 0.02 to 1 mol of a reducing metal (B) is further added at a temperature of $-20°$ C. to $+50°$ C. over one minute to 10 hours, followed by reaction at a temperature of 50° to 500° C. over 1 to 10 hours. After completion of the reaction, the solvent and unreacted materials are removed and the resulting material is subjected to a milling treatment with a ball mill or a vibration mill at a temperature of 20° to 100° C. for 1 to 100 hours, or to a heat treatment with an inert gas under 5 kg/cm$^2$G or lower or under reduced pressure (0.01 to 760 mmHg) at a temperature of 100° to 200° C. for 1 to 10 hours.

The solid product (II) is prepared by reacting the solid product (I) with an electron donor (C) or/and an electron acceptor (D) or a reaction product (G) of these two, once to 5 times relative to each of the latters stepwise. When the reaction is carried out plural times, the respective (C)s, (D)s or (G)s used at the respective times may be the same or different. Even when both (C) and (D) are reacted, the reaction manner is the same as in the case where either one of (C) or (D) is alone reacted, relative to the respective steps.

The reaction is carried out by milling reaction or suspension reaction.

In the case of the milling reaction, 100 g of the solid product (I) is reacted with 1 to 50 g of (C) or (D) in a ball mill or a vibration mill at a temperature of 20° to 100° C. for 1 to 100 hours.

In the case of the suspension reaction, 100 g of the solid product (I) is reacted with 1 to 500 g of (C) or (D) in the presence of 0 to 2 l of a solvent in a suspension state at a temperature of 20° to 200° C. under 0 to 5 kg/cm$^2$G for 10 minutes to 10 hours. A preferable suspension state is that where 100 g of the solid product (I) is suspended in 0.05 to 2 l of a reaction liquid, and as such a reaction liquid, a solvent such as pentane may be used together with (C) and/or (D). After completion of the reaction, the solvent or unreacted materials are removed by filtering-off, decantation or distilling-off under reduced pressure, followed by washing with a solvent. Further it is possible to combine the above milling reaction with the above suspension reaction.

The solid product (III) is prepared by reacting 1 mol of TiCl$_4$ with 0.05 to 10 mols, preferably 0.07 to 2 mols of an organoaluminum compound, or with 0.05 to 10 mols, preferably 0.07 to 2 mols as calculated in terms of aluminum atom, of a reaction product obtained in advance by reacting 1 mol of an organoaluminum compound with 0.05 to 10 mols of an electron donor, the former reaction being carried out at a temperature of $-30°$ C. to $+120°$ C., preferably $-20°$ C. to $+100°$ C., for 30 minutes to 10 hours. TiCl$_4$ and the organoaluminum compound or the reaction product of an organoaluminum compound with an electron donor are diluted with a solvent such as n-pentane, n-hexane, n-heptane, benzene, toluene, monochlorobenzene, etc. and subjected to the reaction. The amount of the solvent used is suitably 0.1 to 5 l per mol of the materials to be diluted. The mixing manner of TiCl$_4$ with an organoaluminum compound or TiCl$_4$ with a reaction product of an organoaluminum compound with an electron donor has no particular limitation, but it is preferable to gradually dropwise add either one of them to another. The resulting solid product (III) formed by the reduction reaction of TiCl$_4$ is filtered off and washed with a solvent such as n-hexane.

The solid product (IV) is prepared by reacting the solid product (III) with an electron donor (C) or/and an electron acceptor (D) or a reaction product (G) of these two, once to 5 times relative to each of them stepwise. When the reaction is carried out plural times, the respective (C)s, (D)s or reaction products (G)s used the respective times may be the same or different. The reaction manner includes (1) a manner wherein the solid product (III) is reacted with (C) and then reacted with (D); (2) a manner wherein the solid product (III) is added to the reaction product (G) of (C) with (D) and they are reacted together; (3) a manner wherein the solid product (III) is reacted with (D) and then reacted with (C); (4) a manner wherein (C) and (D) are added to the solid product (III) in an optional order and in a short time and they are reacted together; etc. As for the proportion of their amounts used in the reaction, (C), (D) or (G) is used in an amount of 10 to 1,000 g based on 100 g of the solid product (III), relative to each time reaction. For this reaction, when a solvent is used in the preparation of the solid product (III), an amount of 50 to 5,000 ml is preferable. The mixing and reaction temperatures are in the range of $-50°$ C. to $+200°$ C., preferably 20° to 100° C., and the reaction time is in the range of about 10 minutes to 10 hours. After completion of the reaction, the resulting product is filtered off and washed with a solvent such as n-hexane.

The solid product (V) is prepared by reacting a reaction product obtained by reacting 1 mol of TiCl$_4$ with 0.05 to 10 mols of an electron donor, (if a solvent is used, in 5,000 ml or less of the solvent), at a temperature of $-10°$ C. to $+100°$ C. under 0 to 2 kg/cm$^2$G for 10 minutes to 5 hours, with 0.05 to 10 mols of an organoaluminum compound or a reaction product of 1 mol of an organoaluminum compound with 0.05 to 10 mols of an electron donor, the amount of the aluminum contained in the latter reaction product corresponding to 0.05 to 10 mols as calculated in terms of the above organoaluminum compound, and the reaction of the former reaction product with the latter reaction product being carried out at a temperature of $-10°$ C. to $+100°$ C. under 0 to 2 kg/cm$^2$ for 10 minutes to 10 hours, followed by filtering-off and washing with a solvent such as n-hexane.

The solid product (VI) is prepared as in the preparation of the solid product (IV) except that the solid product (V) is used in place of the solid product (III).

The solid product (VII) is prepared by subjecting the solid product (I), (III) or (V) to a polymerization treatment with an α-olefin and then reacting the resulting material with an electron donor or/and an electron acceptor. The polymerization treatment with an α-olefin is a separate step from the preactivation described below, and is carried out by combining 100 g of the solid product (I), (III) or (V) with 5 to 500 g of an organoaluminum compound and reacting this combination with an α-olefin in the presence of 10 to 1,000 ml of a solvent, at a temperature of 20° to 80° C., under a polymerization pressure of 0 to 10 kg/cm²G for 30 seconds to 5 hours. The organoaluminum compound used here may be added together with the reducing organoaluminum compound used for reducing TiCl₄ in the preparation step of the solid product (III) or (V). In the polymerization treatment, it is also possible to add a suitable amount of hydrogen for controlling the molecular weight. It is preferable that 1 to 1,000 g of an α-olefin polymer per 100 g of the solid product (I), (III) or (V) be included therein through the polymerization treatment. The solid product (I), (III) or (V) subjected to the polymerization treatment is filtered off and washed with a solvent such as n-hexane. The reaction manner wherein the solid product (I), (III) or (V) subjected to the polymerization treatment with an α-olefin is reacted with an electron donor or/and an electron acceptor or a reaction product (G) of these two, is carried out as in the preparation of the solid product (IV) except that a solid product (III) subjected to the polymerization treatment with an α-olefin is used in place of the solid product (III).

In the above-mentioned preparations of the respective titanium trichloride-containing compositions, the resulting objective materials, after washed with a solvent, are dried into powder or suspended in the solvent as it is, and used in the succeeding step (additional preparation of another titanium trichloride-containing composition or preparation of a preactivated catalyst).

As for the electron donors (C) employed in the present invention, organic compounds containing at least one atom of oxygen, nitrogen, sulfur and phosphorus, such as alcohols, ethers, esters, aldehydes, fatty acids, aromatic.carboxylic acids, ketones, nitriles, amines, amides, urea, thioureas, isocyanates, azo compounds, phosphines, phosphites, phosphinites, thioethers, thioalcohols, etc. are employed. Besides, hydrogen sulfide may be employed. As for concrete examples of electron donors, alcohols such as methanol, ethanol, propanol, butanol, pentanol, hexanol, octanols, phenols such as phenol, cresol, xylenol, ethylphenol, naphthol; ethers such as diethyl ether, di-n-propyl ether, di-n-butyl ether, diisoamyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofuran; esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate; aldehydes such as acetaldehyde, benzaldehyde; fatty acids such as formic acid, acetic acid, propionic acid, butyric acid, oxalic acid, succinic acid, acrylic acid, maleic acid; aromatic acids such as benzoic acid; ketones such as methyl ethyl ketone, methyl isobutyl ketone, benzophenone; nitriles such as acetonitrile; amines such as methylamine, diethylamine, tributylamine, triethanolamine, β(N,N-dimethylamino) ethanol, pyridine, quinoline, α-picoline, 2,4,6-trimethylpyridine, N,N,N',N'-tetramethyl-hexaethylenediamine, aniline, dimethylaniline; amides such as formamide, hexamethyl phosphoric acid triamide, N,N,N',N',N''-pentamethyl-N'-β-dimethylaminoethyl phosphoric acid triamide, octamethylpyrophosphoramide; ureas such as N,N,N',N'-tetramethylurea; isocyanates such as phenylisocyanate, toluylisocyanate; azo compounds such as azobenzene; phosphines such as ethylphosphine, triethylphosphine, tri-n-butylphosphine, tri-n-octylphosphine, triphenylphosphine, triphenylphosphine oxide; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite; thioethers such as diethyl thioether, diphenyl thioether, methyl phenyl thioether, ethylene sulfide, propylene sulfide; and thioalcohols such as ethyl thioalcohol, n-propyl thioalcohol, thiophenol, are mentioned.

Polysiloxanes can also be used as the electron donor.

The polysiloxanes are chain or cyclic siloxane polymers expressed by the general formula

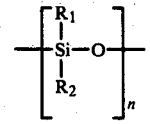

wherein n represents 3–10,000, and $R_1$ and $R_2$ represent the same or different kinds of substituents capable of being combined to Si, and above all, those consisting of one kind of hydrogen, halogen, 1~10C hydrocarbon residual group such as alkyl group, aryl group, etc., alkoxy group, aryloxy group, fatty acid residual group, etc., or those in which two kinds or more of the above-mentioned radicals or groups are distributed and combined in a molecule in various proportions may be employed.

Polysiloxanes commonly employed are those wherein each R in the above-mentioned formula is a hydrocarbon residual group, and as concrete examples, alkylsiloxane polymers such as lower polymers e.g. octamethyltrisiloxane, octaethylcyclotetrasiloxane and polymers e.g. dimethylpolysiloxane, ethylpolycyclosiloxane, methylethylpolysiloxane, etc., further arylsiloxane polymers such as hexaphenylcyclotrisiloxane, diphenylpolysiloxane, and further alkylarylsiloxane polymers such as diphenyloctamethyltetrasiloxane, methylphenylpolysiloxane, etc. are illustrated.

Besides, those wherein $R_1$ is hydrogen or halogen and $R_2$ is a hydrocarbon residual group such as alkyl group, aryl group, etc., e.g. alkylhydrogensiloxane polymers, haloalkylsiloxane polymers, haloarylsiloxane polymers, etc. are illustrated. Further, polysiloxanes wherein each R is alkoxy or aryloxy group or fatty acid residual group can be also employed.

The polysiloxanes are necessary to be in liquid state in the reaction, and it is also necessary that polysiloxanes themselves are in liquid state under the reaction conditions or they are soluble in a solvent used for the reaction when the reaction is carried out in the presence of a solvent.

The viscosity of polysiloxanes employed in suitably in the range of 10–10,000 centistokes, preferably 10–2,000 centistokes, at 25° C.

These electron donors (C) may be also employed in admixture.

As for the electron acceptors (D), halides of elements of III group to VIII group of the Periodic Table are mentioned. Concrete examples thereof are anhydrous aluminum chloride, silicon tetrachloride, stannous chloride, stannic chloride, zirconium tetrachloride, phosphorus trichloride, phosphorus pentachloride, titanium tetrachloride, vanadium tetrachloride, antimony pentachloride, etc. Besides, iodine is mentioned.

Examples of solvents used in the preparation or the polymerization treatment of the solid products (I) to (VII) are aliphatic, aromatic or halogenated hydrocarbons such as n-pentane, n-hexane, n-heptane, n-octane, i-octane, benzene, toluene, xylene, carbon tetrachloride, chloroform, 1,2-dichloroethane, methyl iodide, trichloroethylene, tetrachloroethylene, chlorobenzene, chlorotoluene, chloroxylene, chloroethylbenzene, dichlorobenzene, bromobenzene, etc. These solvents can also be used for the catalyst preparation as well as washing at the time of preparation of the solid products.

The reaction product (G) is prepared by reacting 100 g of an electron donor (C) with 10 to 500 g of an electron acceptor (D) at a temperature of 0° to 80° C. under 0 to 1 kg/cm$^2$G for 10 minutes to 5 hours.

The resulting titanium trichloride-containing composition is then combined with an organoaluminum compound (E) and subjected to a preactivation treatment with an α-olefin (F); and before, during or after the preactivation treatment, an electron donor or/and an electron acceptor or a reaction product (G) of these two is added to any one of the solid products, followed by adding a reaction product (H) of a trialkylaluminum with an electron donor (C) to obtain a preactivated catalyst.

α-Olefins (F) used in the preactivation and those used in the above polymerization treatment are straight chain monoolefins such as ethylene, propylene, butene-1, hexene-1, heptene-1, branched chain monoolefins such as 4-methyl-pentene-1, 2-methyl-pentene-1, 3-methyl-butene-1, etc. Besides, styrene can also be used. These olefins may be the same as or different from those to be regularly polymerized, and two kinds or more of them can be used in admixture.

The reaction product (H) is usually prepared by reacting 1 mol of a trialkylaluminum with 0.01 to 5 mols of an electron donor (C) in a solvent such as n-pentane, n-hexane, n-heptane, etc. at a temperature of −10° C. to +100° C. for 10 minutes to 3 hours. Usually, a trialkylaluminum and an electron donor (C), each one mol, are each diluted with 10 to 5,000 ml of a solvent, and the (C) thus diluted may be added to the trialkylaluminum thus diluted.

Organoaluminum compounds (E) used in the present invention are expressed by the general formula $AlR_nR'_{n'}X_{3-(n+n')}$ (wherein R and R' each represent a hydrocarbon group such as an alkyl group of 1 to 15C, an aryl group of 1 to 12C, an alkaryl of 7–15C, a cycloalkyl group of 6 to 12C or an alkoxy group of 1 to 15C; X represents fluorine, chlorine, bromine or iodine; and n and n' each represent an optional number of $0<n+n'\leq3$). Concrete examples thereof are trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc., alkylaluminum dihalides such as ethylaluminum dichloride, i-butylaluminum dichloride; alkylaluminum hydrides such as diethylaluminum hydride, alkylaluminum sesquihalides such as methylaluminum sesquichloride, ethylaluminum sesquichloride. In addition, alkoxyalkylaluminums such as monoethoxydiethylaluminum, diethoxymonoethylaluminum, etc. can also be used. Among these organoaluminum compounds, trialkylaluminums are used as the raw material for the reaction product (H) and dialkylaluminum monohalides are most preferable as that to be combined with the titanium trichloride composition.

The preactivation can be carried out in a hydrocarbon solvent such as propane, butane, n-pentane, n-hexane, n-heptane, benzene, toluene, etc., a liquefied α-olefin such as liquefied propylene, liquefied butene-1, etc., or a gaseous α-olefin such as ethylene, propylene, etc., and may be carried out in the coexistence of hydrogen.

The preparation of the preactivated catalyst is carried out by mixing and reacting together 0 to 50 l of a solvent, 1 to 500 mmols of an organoaluminum (E), 0 to 30 l of hydrogen, 0.01 to 1,000 g of an α-olefin (F), 0.05 to 10 mmols of an electron donor (C) or/and an electron acceptor (D) or a reaction product (G) of these two and 0.05 to 10 g of a reaction product (H), each based on 1 g of the titanium trichloride-containing composition. The reaction conditions are 0° to 100° C., 0 to 10 kg/cm$^2$G and one minute to 20 hours, and (F) is preferably polymerized in an amount of 0.005 to to 500 g based on 1 g of the titanium trichloride-containing composition.

As will be described below in details, however, the mixing and reaction of the electron donor (C), the electron acceptor (D), the reaction product (G) of these two and the reaction product (H) in the preparation of the preactivated catalyst may be carried out before or after the reaction of the titanium trichloride-containing composition—the organoaluminum (E) with the α-olefin. The mixing and reaction conditions are the same as those in the above case where the whole of the materials are at the same time mixed and reacted.

In the preactivation, it is also possible to make coexistent α-olefin polymer particles obtained in advance by slurry polymerization, bulk polymerization or gas phase polymerization. Such polymers may be either the same as or different from α-olefin polymers to be regularly polymerized later. The amount of the polymer particles capable of being made coexistent is in the range of 0 to 5,000 g per g of the titanium trichloride-containing composition.

The solvent or α-olefin used in the preactivation can be removed by distillation under reduced pressure, filtering-off or the like means, during the preactivation or after its completion. It is also possible to make the titanium trichloride-containing composition contained in the catalyst after completion of the preactivation, suspend in a solvent in an amount not exceeding 80 l per g of the composition.

The process for preparing the preactivated catalyst includes various concrete manners. Examples of main manners are as follows:

(1) a manner wherein an electron donor (C) or/and an electron acceptor (D) or a reaction product (G) of these two is reacted with an organoaluminum compound (E) once to 10 times and the resulting reaction product is reacted with the titanium trichloride-containing composition, (F) and the reaction product (H) to obtain the preactivated catalyst;

(2) a manner wherein an organoaluminum compound (E) is combined with the titanium trichlorid-containing composition and the resulting combination is reacted with (C) or/and (D) or the reaction product (G) once the 10 times, followed by reacting (F) and the reaction product (H);

(3) a manner wherein (E) is combined with the titanium trichloride-containing composition; (F) is added to the resulting combination for reaction; (C) or/and (D) or (G) is then reacted once to 10 times; and (H) is added;

(4) a manner wherein (E) is reacted with the titanium trichloride-containing composition, (F) and (H), followed by reacting (C) or/and (D) or (G) once to 10 times;

(5) a manner wherein (E), the titanium trichloride-containing composition, (H) and (C) or/and (D) or (G) are added in an optional order in the presence of (F);

(6) a manner wherein (E), the titanium trichloride-containing composition, (H) and (C) or/and (D) or (G) are added in an optional order, followed by adding (F) for reaction; and (7) a manner wherein (H) is further added after any one of the above manners (1) to (6). In the above manners (1) to (7), (C), (D) or (G) may be used in two or more kinds, respectively, and the reaction of (F) may be carried out in gas phase, liquefied α-olefin or a solvent. Removal or addition of the solvent may be carried out in any step during the reaction of (F) with the above combination of (E) with the titanium trichloride-containing composition in the presence of this combination i.e. during the polymerization treatment; and removal of α-olefin may be carried out in any step after the reaction of α-olefin. The manners (1) to (7) may be carried out adding α-olefin polymers obtained in advance. Further, solvent or unreacted α-olefin may be removed after the preactivation to obtain the catalyst in the form of powder.

In the manners (1) to (7), it is also possible to use hydrogen together with α-olefin. The preparation of the preactivated catalyst is completed by adding and reacting the last component, and there is no essential difference between whether the catalyst is brought into slurry state or powder form.

The control of the stereoregularity of polymers in the polymerization of α-olefins of the present invention is carried out by varying the molar ratio of the electron donor (C) to the trialkylaluminum in the reaction product (H) used in the above preparation of the preactivated catalyst (the ratio will hereinafter be often referred to (H) molar ratio). The ratio can be varied in the range of 0.01 to 5. If the ratio is reduced, IR-$\tau$ becomes lower, and if the ratio is increased, IR-$\tau$ becomes higher.

The preactivated catalyst prepared as above is used for producing α-olefin polymers. The preactivated catalyst can be used either for slurry polymerization carried out in a hydrocarbon solvent such as n-hexane, n-heptane or for bulk polymerization carried out in a liquefied α-olefin monomer such as liquefied propylene, liquefied butene, and the catalyst can also be preferably used for gas phase polymerization of α-olefins such as propylene. Further the catalyst can also be preferably used for slurry polymerization or bulk polymerization followed by gas phase polymerization, as modifications of gas phase polymerization.

The gas phase polymerization may be carried out either in a fluidized bed manner without agitation elements or by fluidization with agitation elements. The gas phase polymerization may also be carried out with stirring by means of a vertical or horizontal type paddle. Further the polymerization may also be carried out either continuously or batchwise.

The slurry polymerization or bulk polymerization followed by gas phase polymerization, as modifications of gas phase polymerization, can also be carried out either continuously or batchwise. The following two polymerization manners are illustrated:

(1) a manner wherein after the slurry or bulk polymerization, solvent or liquefied α-olefin is removed and successively a gaseous α-olefin is fed to carry out gas phase polymerization; and (2) a manner wherein slurry or bulk polymerization is carried out, and when the α-olefin polymerization is continued without removing solvent or α-olefin, the amount of the solvent or liquefied α-olefin becomes small and the liquid portion disappears since the small amount of the solvent or liquefied α-olefin is occluded in the resulting polymer particles; hence the slurry or bulk polymerization is transferred, without applying any particular operation, to gas phase polymerization where gaseous α-olefin is fed. The plural stage polymerization consisting of a combination of slurry or bulk polymerization with gas phase polymerization affords preferable results particularly in the continuous polymerization. Examples of the polymerization manner are as follows:

slurry or bulk polymerization is carried out in the first stage and the polymerization is continued till polymer particles containing 30% or less of solvent or liquefied α-olefin is obtained, or solvent or liquefied α-olefin is removed; thereafter α-olefin gas phase polymerization is carried out in the second stage while polymer particles are fluidized. In the second stage gas phase polymerization, the catalyst of the first stage is used as it is, but a fresh catalyst may be added in the second stage. In this case, it is preferable to carry out the polymerization so that the ratio by weight of the amount of α-olefin polymerized in the slurry or bulk polymerization to that in the gas phase polymerization can be 1: 0.1 to 100.

As for the polymerization conditions of α-olefins, any of the slurry polymerization, the bulk polymerization and the gas phase polymerization are carried out at a polymerization temperature of room temperature (20° C.) to 200° C., under a polymerization pressure of the atmospheric pressure (0 kg/cm$^2$G) to 50 kg/cm$^2$G and usually for about 5 minutes to 10 hours. In the polymerization, addition of a suitable amount of hydrogen for controlling the molecular weight and the like means are the same as those in conventional polymerization processes.

Examples of α-olefins subjected to polymerization in the present invention are straight chain monoolefins such as ethylene, propylene, butene-1, branched chain monoolefins such as 4-methyl-pentene-1, 2-methyl-pentene-1, 3-methyl-butene-1 and diolefins such as butadiene, isoprene, chloroprene. Besides, styrene can also be used. According to the process of the present invention, not only homopolymerization but copolymerization of these olefins can be carried out by combining them with each other, e.g. propylene with ethylene, butene-1 with ethylene, propylene with butene-1. In this case, it is possible to carry out the polymerization either in the form of mixed monomers or using different α-olefins between the first stage slurry or bulk polymerization and the second stage gas phase polymerization in the above plural stage polymerization.

The first effectiveness of the present invention is that it is possible in producing polypropylene to optionally control the values of IR-τ of polymers in the range of 0.88 to 0.96 in the case of homopolymers and in the range of 0.83 to 0.96 in the case of copolymers, without any increase in the amount of atactic polymers as n-hexane-soluble. Thus it has become possible to overcome the following disadvantages experienced so far:

In order to produce polymers having different values of IR-τ in a polymerization plant, it has so far been necessary to use different catalyst system; hence the catalyst contained in a catalyst tank has been replaced by another each time, followed by washing, or copolymers have been produced by using a comonomer, which, however, has changed other physical properties. Namely it has become possible to vary the values of IR-τ merely by varying the ratio of specified components among those constituting the catalyst, without varying other components. In producing polybutene-1, it has become possible to optionally control the X-ray crystallinity in the range of 50 to 68%, without any increase in ether-soluble polymers.

The second effectiveness of the present invention is that it has become possible to optionally control the physical properties of polymers obtained, particularly toughness; thus it has become possible to optionally correspond to application fields where either higher toughness or lower toughness is required; hence it has become possible to cover uses in broad application fields. In the case of bending modulus taken as an example of the toughness, it is possible to optionally control e.g. the values of homopolypropylene in the range of 0.90 to $1.4 \times 10^4$ kg/cm$^2$.

The third effectiveness of the present invention is that whether even when a homopolypropylene having as low a IR-τ value as 0.88 to 0.93 is produced, or even when a propylene copolymer having as low as IR-τ value as 0.83 to 0.93 is produced, the amount of atactic polymers as n-hexane-soluble does not increase, that is, it is possible to suppress the formation of atactic polymers.

The fourth effectiveness of the present invention is that it is possible to increase the polymer yield per g of the titanium trichloride-containing composition as a raw material of the catalyst. By carrying out the preactivation of the present invention, it is possible to obtain polymer yields which are 1.2 to 3 times those in a case where no reaction product (H) is used before, after or during the preactivation. In other words, it is possible to reduce the amount of catalyst used for polymerization when it is intended to obtain a given amount of polymers; and also even if the amount of alcohols, alkylene oxides, steam, water or the like used for killing the catalyst after completion of the polymerization reaction or for purifying the resulting polymers is reduced, polymers are not colored. Further, such bad effects are eliminated that the physical properties of polymers are injured or molds are rusted at the time of molding polymers; hence it is possible to simplify the purification process of polymers.

The present invention will be further illustrated by way of the following Examples:

EXAMPLE 1

(1) Preparation of Catalyst n-Hexane (60 ml), diethylaluminum monochloride (DEAC) (0.05 mol) and diisoamyl ether (0.12 mol) were mixed together at 25° C. for one minute and then reacted at the same temperature for 5 minutes to obtain a reaction product liquid (the molar ratio of diisoamyl ether/DEAC:2.4). TiCl$_4$ (0.4 mol) was introduced into a reactor purged with nitrogen and heated to 35° C. The total amount of the above reaction product liquid was dropwise added thereto over 3 hours and the mixture was kept at the same temperature for 30 minutes, followed by elevating the temperature up to 75° C., reacting it further for one hour, cooling down to room temperature, removing the supernatant liquid, and 4 times repeating a procedure of adding 400 ml of n-hexane and removing the supernatant liquid by decantation to obtain 19 g of a solid product. The total amount of this solid product was suspended in 300 ml of n-hexane, and to the resulting suspension were added diisoamyl ether (16 g) and TiCl$_4$ (35 g) at room temperature (20° C.) over about one minute, followed by reaction at 65° C. for one hour. After completion of the reaction, the liquid was cooled down to room temperature (20° C.), followed by removing the supernatant liquid by decantation, 5 times repeating a procedure of adding 400 ml of n-hexane, stirring for 10 minutes, still standing and removing the supernatant liquid, and drying the resulting liquid under reduced pressure (1 mmHg) at 20° C. for 30 minutes to obtain a solid product (IV) (this solid product obtained in this Example will hereinafter be referred to as solid product (IV-1)). The TiCl$_3$ content in 1 g of this solid product (IV-1) was 85% by weight.

(2) Preparation of Preactivated Catalyst n-Hexane (12.8 l) was introduced into a 30 l capacity stainless steel reactor having slant blades, purged with nitrogen gas. Diethylaluminum monochloride (44 mmol) and the above solid product (IV-1) obtained in the above item (1) (309 mg) were added thereto, and further methyl p-toluylate (1.0 mmol) was added, followed by closing the reactor. Propylene fed through an introducing tube into the reactor was reacted at 25° C. under 2 kg/cm$^2$G for 10 minutes (reacted propylene per g of the solid product (IV-1): 3.2 g), followed by adding a reaction solid product (H) (1.1 g) obtained by reacting together n-hexane (320 ml), triethylaluminum (4.16 mmol) and methyl p-toluylate (4.16 mmol) ((H) molar ratio: 1.0) at 35° C. for 30 minutes and then separating the solvent, to obtain a preactivated catalyst.

(3) Propylene Polymerization

Hydrogen gas (2,400 ml) was introduced into the above reactor containing the catalyst obtained above, and polymerization reaction was carried out under a propylene partial pressure of 10 kg/cm$^2$G, at a polymerization temperature of 70° C., for 4 hours. After completion of the reaction, methanol (800 ml) was introduced into the reactor to terminate the polymerization reaction, followed by pouring the contents in a Buchner funnel, washing them with n-hexane three times, each time using 3 l to separate them into isotactic polypropylene (IPP) as n-hexane-insoluble and atactic polypropylene (APP) as n-hexane-soluble, which were then dried to obtain polymers. The amounts of IPP and APP were 2,500 g and 10 g, respectively. The IPP polymer yield per g of the solid product (IV-1), the isotactic index $$\left(\frac{IPP}{IPP + APP} \times 100\right)$$

and the atactic index (100-isotactic index) were 8,090 g, 99.6 and 0.4, respectively.

(4) Measurements of IR-τ and Bending Modulus

According to Luongo's method, the polymer obtained in Example 1 was annealed at 135° C. for 120 minutes and the IR-τ value of the resulting polymer was measured to give 0.95. Further, the value of the bending modulus measured according to JISK-7203 was 1.35×10⁴ kg/cm².

EXAMPLE 2

Example 1 was repeated except that 2.08 mmols of methyl p-toluylate were used in the preparation of the reaction product (H) ((H) molar ratio: 0.50, the amount of the reaction product (H): 0.8 g).

EXAMPLE 3

Example 1 was repeated except that 0.96 mmol of methyl p-toluylate was used in the preparation of the reaction product (H) ((H) molar ratio: 0.23, the amount of the reaction product (H): 0.6 g).

EXAMPLE 4

Example 1 was repeated except that 0.64 mmol of methyl p-toluylate was used in the preparation of the solid product (H) ((H) molar ratio: 0.15, the amount of the reaction product (H): 0.57 g).

EXAMPLE 5

Example 1 was repeated except that 8.32 mmols of methyl p-toluylate were used in the preparation of the solid product (H). ((H) molar ratio: 2, the amount of the reaction product (H): 2.29 g).

COMPARATIVE EXAMPLE 1

Example 1 was repeated except that the reaction product (H) was not added in the preparation of the catalyst.

COMPARATIVE EXAMPLE 2

Example 1 was repeated except that 4.16 mmols of triethylaluminum were used in place of the reaction product (H), in the preparation of the catalyst.

COMPARATIVE EXAMPLES 3 AND 4

Example 1 was repeated except that 4.16 mmols (Comparative example 3) or 0.96 mmol (Comparative example 4) of methyl p-toluylate was used in place of the reaction product (H), in the preparation of the catalyst. In either of the cases, the values of IR-τ and bending modulus of the resulting polypropylenes were unchanged.

COMPARATIVE EXAMPLE 5

Example 1 was repeated except that propylene was not reacted in the preparation of the preactivated catalyst of Example 1, (2). In the absence of the step of reacting propylene for the preactivation, the isotactic index decreased.

EXAMPLE 6

Example 1 was repeated except that ethyl benzoate (3.2 mmols) was used in place of methyl p-toluylate in the preparation of the reaction product (H) ((H) molar ratio: 0.77, the amount of the reaction product (H): 0.95 g).

EXAMPLE 7

Example 1 was repeated except that the preparation of the reaction product (H) was carried out using ethyl p-anisate (1.6 mmol) and triisobutylaluminum (4.8 mmols) ((H) molar ratio: 0.33, the amount of the reaction product (H): 1.24 g).

EXAMPLE 8

Example 1 was repeated except that the reaction product (H) in the preparation of the preactivated catalyst was replaced by a reaction product (H) (0.87 g) obtained by reacting N,N,N',N'-tetramethylurea (1.0 mmol) with triisobutylaluminum (3.8 mmols) ((H) molar ratio: 0.26) in n-hexane (200 ml) at 20° C. for 10 minutes.

EXAMPLE 9

Example 1 was repeated except that the reaction product (H) in the preparation of the preactivated catalyst was replaced by N,N,N',N'-tetramethylurea (0.54 mmol) and triisobutylaluminum (3.8 mmols) ((H) molar ratio: 0.14, yield: 0.82 g).

The results of the above Examples 1~9 and Comparative examples 1~5 are shown in Table 1.

TABLE 1

| Nos. of Example and Comp. ex. | Polymer yield per g of TiCl₃— containing composition (g) | Isotactic index | IR-τ | Bending modulus (× 10⁴ kg/cm²) | MFR* |
|---|---|---|---|---|---|
| Ex. 1 | 8,090 | 99.6 | 0.95 | 1.35 | 4.1 |
| Ex. 2 | 8,100 | 99.4 | 0.94 | 1.30 | 4.2 |
| Ex. 3 | 8,120 | 99.2 | 0.92 | 1.12 | 4.0 |
| Ex. 4 | 8,180 | 99.0 | 0.89 | 0.97 | 3.8 |
| Ex. 5 | 7,900 | 99.5 | 0.96 | 1.42 | 3.9 |
| Comp. ex. 1 | 6,100 | 99.0 | 0.93 | 1.20 | 3.8 |
| Comp. ex. 2 | 4,200 | 88.0 | 0.86 | 0.85 | 3.2 |
| Comp. ex. 3 | 4,100 | 99.0 | 0.94 | 1.30 | 3.1 |
| Comp. ex. 4 | 4,300 | 99.0 | 0.94 | 1.30 | 3.1 |
| Comp. ex. 5 | 7,100 | 95.0 | 0.92 | 1.13 | 3.2 |
| Ex. 6 | 8,100 | 99.0 | 0.94 | 1.30 | 3.4 |
| Ex. 7 | 8,090 | 99.0 | 0.92 | 1.15 | 3.2 |
| Ex. 8 | 6,700 | 99.3 | 0.93 | 1.20 | 3.8 |
| Ex. 9 | 6,600 | 98.8 | 0.87 | 0.90 | 3.4 |

*Melt flow rate (according to ASTMD-1238 (L))

It is apparent from the above Table that with regard to a set of Examples 1~5 and a set of Examples 8 and 9, the values of IR-τ were stepwise different according to the differences in the molar ratio of the electron donor (C) to AlR₃, used for preparing the reaction product (H) added after the preactivation, whereas the values of isotactic index were substantially not different; further, with regard to the respective Comparative examples, no desired effectiveness was obtained (i) when no reaction product (H) was added after the preactivation, or (ii) when an electron donor (C) was added in place of the reaction product (H) to change the molar ratio, or (iii)

when no propylene was reacted although the reaction product (H) was added.

EXAMPLE 10

Example 1 was repeated except that in the preparation of the preactivated catalyst, the reaction of propylene was carried out under 4 kg/cm$^2$G, at 30° C. for 5 minutes, and the reaction product (H) was replaced by that of Example 2 (the amount of the solid product (IV-1) used was 290 mg and the amount of propylene reacted was 4.3 g per g of (IV-1)).

EXAMPLE 11

Example 10 was repeated except that in the preparation of the preactivated catalyst, the reaction product (H) was replaced by that prepared in Example 4.

EXAMPLE 12

Example 1 was repeated except that the preactivated catalyst was replaced by that obtained by mixing together di-n-propylaluminum chloride monochloride (48 mmols), diethyl thioether (0.2 mmol) and α-picoline (0.5 mmol); adding the solid product (IV-1) (300 mg); adding the reaction product (H) (0.8 g) used in Example 2; and reacting propylene under a propylene partial pressure of 1 kg/cm$^2$G, at 40° C. for 30 minutes (this reaction corresponding to that of 8.6 g per g of the solid product (IV-1)).

EXAMPLE 13

Example 12 was repeated except that the reaction product (H) was replaced by that prepared in Example 4.

EXAMPLE 14

Example 1 was repeated except that the preactivated catalyst was replaced by that obtained by mixing di-n-butylaluminum monochloride (58 mmols) with the solid product (IV-1) (310 mg); reacting propylene under a propylene partial pressure of 0.2 kg/cm$^2$G at 20° C. for 4 hours (this reaction corresponding to that of 4.8 g per g of the solid product (IV-1); thereafter adding methyl alcohol (2 mmols); and adding the reaction product (H) (0.8 g) prepared in Example 2.

EXAMPLE 15

Propylene polymerization was carried out as in Example 14 except that the reaction product (H) was replaced by that prepared in Example 4.

EXAMPLE 16

Example 1 was repeated except that the preactivated catalyst was replaced by that obtained by mixing together diethylaluminum chloride (40 mmols), the solid product (IV-1) (350 mg) and the reaction product (H) (0.8 g) prepared in Example 2; reacting propylene under a propylene partial pressure of 0.6 kg/cm$^2$G, at 50° C. for 60 minutes (this reaction corresponding to that of 80.0 g per g of the solid product (IV-1); and thereafter adding N,N,N',N'-tetramethylurea (0.2 mmol).

EXAMPLE 17

Example 16 was repeated except that the reaction product (H) was replaced by that prepared in Example 4.

EXAMPLE 18

Ethyl benzoate (0.1 mol) and AlCl$_3$ (anhydrous) (0.1 mol) were added to n-hexane (100 ml), followed by heating the mixture at 68° C. for 30 minutes, cooling, filtering off, washing with n-hexane and drying to obtain a reaction product (G) of ethyl benzoate—AlCl$_3$ (1:1).

Propylene (25 g) was dissolved in n-hexane, and to the resulting solution were added diethylaluminum monochloride (28 mmols), the solid product (IV-1) (350 mg), the above reaction product (G) of ethyl benzoate—AlCl$_3$ (0.7 mmol) and the reaction product (H) (0.8 g) prepared in Example 2, followed by reaction at 16° C. for 3 hours (this reaction corresponding to that of 1.2 g per g of the solid product (IV-1), to prepare a preactivated catalyst. Using this catalyst, propylene polymerization was carried out as in Example 1.

EXAMPLE 19

Example 18 was repeated except that the reaction product (H) was replaced by that prepared in Example 4.

The results of the above Examples 10–19 are shown in Table 2.

TABLE 2

| Nos. of Examples | Polymer yield per g of TiCl$_3$— containing composition (g) | Isotactic index | IR-τ | Bending modulus (× 10$^4$ kg/cm$^2$) | MFR |
|---|---|---|---|---|---|
| Ex. 10 | 8,090 | 99.2 | 0.94 | 1.30 | 3.8 |
| Ex. 11 | 8,100 | 99.0 | 0.89 | 0.95 | 3.4 |
| Ex. 12 | 8,120 | 99.6 | 0.94 | 1.32 | 3.8 |
| Ex. 13 | 8,140 | 99.3 | 0.88 | 0.92 | 3.6 |
| Ex. 14 | 7,800 | 99.5 | 0.93 | 1.20 | 3.2 |
| Ex. 15 | 7,850 | 99.0 | 0.88 | 0.90 | 3.1 |
| Ex. 16 | 7,300 | 99.4 | 0.94 | 1.30 | 3.8 |
| Ex. 17 | 7,300 | 99.0 | 0.89 | 0.95 | 3.2 |
| Ex. 18 | 6,800 | 99.8 | 0.96 | 1.45 | 3.1 |
| Ex. 19 | 6,900 | 99.3 | 0.90 | 1.00 | 3.4 |

It is apparent from the above Table that in such a set of Examples 10–19, the values of IR-τ are different to a large extent according to the differences between the molar ratios of electron donors (C) to AlR$_3$ used for preparing the reaction products (H) added before, after or during the preactivation, whereas the values of isotactic index are substantially not different.

EXAMPLES 20–22 n-Hexane (200 ml) and TiCl$_4$ (0.45 mol) were introduced into a reactor and cooled down to −5° C. Diethylaluminum monochloride (0.45 mol) diluted with n-hexane (84 ml) was dropwise added through a dropping funnel at a temperature of −5° C. to 0° C. over 3 hours, followed by keeping the temperature at 70° C. for one hour to effect the reduction reaction, cooling down to room temperature (20° C.), removing the supernatant liquid by decantation, three times repeating a procedure of adding 250 ml of n-hexane, stirring for 30 minutes, still standing and removing the supernatant liquid, and drying, to obtain a solid product (69 g) which was then suspended in n-hexane (140 ml). To the resulting suspension was added diisoamyl ether (48 g) and the mixture was reacted at 40° C. for one hour, followed by adding n-hexane (200 ml), stirring for 30 minutes, still standing, removing the supernatant liquid and drying to obtain a solid product (72 g). To this solid product were added n-hexane (280 ml) and diisoamyl ether (7 g), and further added TiCl$_4$ (125 g), followed by reaction at 65° C. for 2 hours, drying, filtering off in a dry box, 5 times washings with n-hexane (50 ml) and drying to obtain a solid product (IV) having a TiCl$_3$ content of 87% (the solid product obtained in this Example will hereinafter be referred to as (IV-2)). Examples 2, 3 and 4 were repeated, respectively, except that the solid product (IV) was replaced by the solid product (IV-1) (Examples of such repetitions being referred to as Examples 20, 21 and 22, correspondingly to the order of Examples 2, 3 and 4).

COMPARATIVE EXAMPLE 6

Example 20 was repeated except that the reaction product (H) was not used in the preparation of the preactivated catalyst.

EXAMPLES 23-25 n-Hexane (200 ml) and TiCl$_4$ (87 g) (0.46 mol) were introduced into a reactor purged with nitrogen gas and cooled down to −5° C., followed by dropwise adding diethylaluminum monochloride (Al(C$_2$H$_5$)$_2$Cl) (94 g) (0.78 mol) diluted with n-hexane (84 ml) over 3 hours, while keeping the reduction temperature at −5° C. to 0° C., after which the temperature was elevated up to 70° C. and propylene was reacted for one hour while it was fed so as to keep its gauge pressure at 1 kg/cm$^2$G. After completion of the reaction, unreacted propylene was purged, and the contents were cooled, followed by filtering off in a dry box purged with nitrogen gas and twice washings with n-hexane (100 ml) to obtain a polymerization-treated solid product (74 g) (α-olefin polymer 4.2 g/100 g reduction solid).

Next, n-hexane (120 ml) and the above polymerization-treated solid product (60 g) were introduced into a reactor, and diisoamyl ether (54 g) as ED and TiCl$_4$ (74 g) as EA were added, followed by reaction at 30° C. for one hour, three times repeating a procedure of adding 250 ml of hexane and decantation and rendering the resulting material 200 ml with n-hexane to obtain a solid product (65.4 g) suspended in n-hexane.

To the suspension was further added a methylpolysiloxane hydride (8 g) (Tashiba Silicone Oil TSF-484, a tradename of a product manufactured by Toshiba company, viscosity 16 centistokes), followed by reaction at 65° C. for one hour, filtering off in a dry box, 5 times washings with n-hexane (50 ml) and drying to obtain a solid product (VII) having a TiCl$_3$ content of 81%. Examples 2, 3 and 4 were repeated, respectively, except that the above solid product (VII) was used in place of the solid product (IV-1) (Examples of such repetitions being referred to as Examples 23, 24 and 25 correspondingly to Examples 2, 3 and 4).

COMPARATIVE EXAMPLE 7

Example 23 was repeated except that the reaction product (H) was not used in the preparation of the preactivated catalyst.

EXAMPLES 26-28

TiCl$_4$ (75 mmols), di-n-butyl ether (50 mmols) and toluene (75 ml) were mixed together at 28° C. and reacted at the same temperature for 30 minutes to obtain a reaction product liquid. To this liquid was added at 80° C. over 3 minutes a reaction product liquid obtained by mixing together n-hexane (40 ml), triethylaluminum (12.5 mmols) and di-n-butyl ether (12.5 mmols) at 20° C. and reacting them at the same temperature for 10 minutes. The resulting mixture was kept at 80° C. for 30 minutes, followed by cooling, washing with n-hexane and drying to obtain a solid product (V) having a TiCl$_3$ content of 88%. Examples 2, 3 and 4 were repeated, respectively, except that the above solid product (V) was used in place of the solid product (IV-1) (Examples of such repetitions being referred to as Examples 26, 27 and 28 corresponding to Examples 2, 3 and 4).

COMPARATIVE EXAMPLE 8

Example 26 was repeated except that the reaction product (H) was not used in the preparation of the preactivated catalyst.

EXAMPLES 29-31

To the solid product (V) (3 g) obtained in Example 26 were added n-hexane (20 ml), di-n-pentyl ether (4 g) and TiCl$_4$ (20 g), and the mixture was reacted at 70° C. for one hour, followed by cooling, washing with n-hexane and drying to obtain a solid product (VI) (TiCl$_3$ content: 84%). Examples 2, 3 and 4 were repeated, respectively, except that the above solid product (VI) was used in place of the solid product (IV-1) (Examples of such repetitions being referred to as Examples 29, 30 and 31 correspondingly to Examples 2, 3 and 4).

COMPARATIVE EXAMPLE 9

Example 29 was repeated except that the reaction product (H) was not used in the preparation of the preactivated catalyst.

EXAMPLES 32~34

Triethylaluminum (0.08 mol) and di-n-butyl ether (0.48 mol) were dropwise added to n-heptane (200 ml) at 15° C. over 5 minutes, followed by allowing the mixture to stand for further 10 minutes for reaction. The total amount of the resulting reaction liquid was added to a solution of TiCl$_4$ (0.40 mol) in toluene (160 ml), and the temperature was raised up to 70° C. to react them for 30 minutes, followed by cooling, filtering, washing with n-hexane and drying to obtain a solid product (III) having a TiCl$_3$ content of 90%. Examples 2, 3 and 4 were repeated except that the above solid product (III) was used in place of the solid product (IV-1) (Examples of such repetitions being referred to as Examples 32, 33 and 34 correspondingly to Examples 2, 3 and 4).

COMPARATIVE EXAMPLE 10

Example 32 was repeated except that the reaction product (H) was not used in the preparation of the preactivated catalyst.

EXAMPLES 35-37

Examples 2, 3 and 4 were repeated, respectively, except that a titanium trichloride (AA) (a commercially available product having a composition of TiCl$_3$·$\frac{1}{3}$AlCl$_3$ and having a tradename of "STAUFFER AA" was employed; its TiCl$_3$ content was 77%; and it corresponded to the solid product (I)) was used in place of the solid product (IV-1) (Examples of such repetitions being referred to as Examples 35, 36 and 37 correspondingly to Examples 2, 3 and 4).

COMPARATIVE EXAMPLE 11

Example 35 was repeated except that the reaction solid product (H) was not used in the preparation of the preactivated catalyst.

EXAMPLES 38–40

Into a reactor purged with nitrogen gas were introduced toluene (100 ml), the above titanium trichloride (AA) (50 g) as the solid product (I), and a methylhydrogenpolysiloxane (8 g) (Toshiba Silicone Oil TSF-484, a tradename of a product manufactured by Toshiba Company; viscosity 16 centistokes). The mixture was reacted together at 120° C. for one hour, followed by cooling, three times repeating a procedure of adding n-heptane (100 ml) and removing the supernatant liquid by decantation and drying to obtain a solid product (46 g). To this product were added n-heptane (100 ml), diisoamyl ether (39 g) and $TiCl_4$ (30 g), and the mixture was reacted together at 100° C. for one hour, followed by cooling, three times repeating a procedure of adding n-hexane (100 ml) and removing the supernatant liquid by decantation, and drying to obtain a solid product (II) having a $TiCl_3$ content of 77%. Examples 2, 3 and 4 were repeated except that the above solid product (II) was used in place of the solid product (IV-1) (Examples of such repetitions being referred to as Examples 38, 39 and 40 correspondingly to Examples 2, 3 and 4).

COMPARATIVE EXAMPLE 12

Example 38 was repeated except that the reaction product (H) was not used in the preparation of the preactivated catalyst.

The results of the above Examples 20–40 and Comparative examples 6–12 are shown in Table 3.

TABLE 3

| Nos. of Example and Comp. ex. | | Polymer yield per g of $TiCl_3$— containing composition (g) | Isotactic index | IR-τ | Bending modulus ($\times 10^4$ kg/cm$^2$) | MFR |
|---|---|---|---|---|---|---|
| Ex. 20 | | 6,010 | 99.0 | 0.93 | 1.20 | 3.2 |
| Comp. ex. | 6 | 4,900 | 98.0 | 0.94 | 1.30 | 3.4 |
| Ex. 21 | | 6,050 | 98.5 | 0.90 | 1.00 | 3.1 |
| Ex. 22 | | 6,080 | 98.0 | 0.88 | 0.90 | 3.4 |
| Ex. 23 | | 6,700 | 99.0 | 0.93 | 1.20 | 3.1 |
| Comp. ex. | 7 | 5,200 | 98.0 | 0.94 | 1.30 | 3.6 |
| Ex. 24 | | 6,780 | 98.8 | 0.91 | 1.05 | 3.8 |
| Ex. 25 | | 6,800 | 98.2 | 0.89 | 0.97 | 3.9 |
| Ex. 26 | | 5,900 | 99.1 | 0.93 | 1.20 | 3.4 |
| Comp. ex. | 8 | 5,200 | 98.0 | 0.94 | 1.30 | 3.4 |
| Ex. 27 | | 5,950 | 98.9 | 0.92 | 1.12 | 3.8 |
| Ex. 28 | | 5,980 | 98.5 | 0.90 | 1.00 | 3.6 |
| Ex. 29 | | 6,300 | 99.2 | 0.93 | 1.20 | 3.2 |
| Comp. ex. | 9 | 5,400 | 98.5 | 0.94 | 1.30 | 3.3 |
| Ex. 30 | | 6,380 | 99.0 | 0.92 | 1.15 | 3.3 |
| Ex. 31 | | 6,400 | 98.8 | 0.90 | 1.00 | 3.4 |
| Ex. 32 | | 5,200 | 99.0 | 0.93 | 1.20 | 3.1 |
| Comp. ex. | 10 | 4,200 | 98.0 | 0.94 | 1.30 | 3.2 |
| Ex. 33 | | 5,280 | 98.8 | 0.91 | 1.05 | 3.2 |
| Ex. 34 | | 5,300 | 98.4 | 0.89 | 0.95 | 3.3 |
| Ex. 35 | | 1,400 | 96.0 | 0.91 | 1.10 | 3.4 |
| Comp. ex. | 11 | 1,100 | 94.5 | 0.92 | 1.20 | 3.1 |
| Ex. 36 | | 1,450 | 95.5 | 0.89 | 0.95 | 3.3 |
| Ex. 37 | | 1,480 | 94.0 | 0.86 | 0.85 | 3.2 |
| Ex. 38 | | 4,300 | 98.0 | 0.92 | 1.15 | 3.1 |
| Comp. ex. | 12 | 3,400 | 97.8 | 0.94 | 1.30 | 3.4 |
| Ex. 39 | | 4,350 | 97.9 | 0.90 | 1.00 | 3.2 |
| Ex. 40 | | 4,400 | 97.5 | 0.88 | 0.90 | 3.3 |

It is apparent from the above Table that in each set of experimental results consisting of three Examples and one Comparative example, the respective Comparative examples (wherein the reaction product (H) was not used) had a tendency that they were inferior in the polymer yield to the respective corresponding Examples and somewhat higher in the IR-τ value than the Examples; and on the other hand, within the respective sets of Examples, the values of IR-τ of the polypropylenes obtained were different to a large extent according to the differences in the molar ratios of the electron donors (C) to $AlR_3$ used for preparing the reaction product (H), whereas the isotactic indexes were substantially not different.

EXAMPLE 41

Ethyl p-toluylate (0.15 mmol) and triethylaluminum (0.3 mmol) were reacted together in n-heptane (10 ml) at 25° C. for 20 minutes to obtain a reaction product (H) (59 mg) ((H) molar ratio: 0.5). Diethylaluminum monochloride (10 mmols) was dissolved in n-pentane (50 ml), and to the resulting solution were added triphenylphosphine (0.1 mmol), the solid product (IV-1) (350 mg) and the total amount of the above reaction solid product (H), followed by reacting propylene under a propylene partial pressure of 1 kg/cm$^2$G at 23° C. for 10 minutes (reacted propylene: 8.2 g per g of the solid product (IV-1)), and removing unreacted propylene and n-heptane under a reduced pressure of 1 mmHg at 20° C. for 0.5 hour to obtain a preactivated catalyst in the form of powder. Into a reactor containing this catalyst were added propylene monomer (7 kg) and hydrogen (2,600 ml), and bulk polymerization of propylene was carried out at 70° C. for 3 hours. Five grams of the resulting polymer were allowed to stand in n-hexane (200 ml) at 20° C. for 24 hours, and filtered off to obtain a polymer.

EXAMPLE 42

Example 41 was repeated except that ethyl p-toluylate (0.05 mmol) was used in the preparation of the preactivated catalyst (H) ((H) molar ratio: 0.17, the amount of (H) formed: 42 mg).

EXAMPLE 43

Ethyl p-anisate (2.0 mmols) and triethylaluminum (4.0 mmols) were reacted together in n-hexane (30 ml) at 30° C. for 4 hours to obtain a reaction product (H) (0.82 g) ((H) molar ratio: 0.5). Into a stainless steel reactor equipped with slant blades were added polypropylene powder (80 g) obtained in advance by slurry polymerization, n-hexane (800 ml), di-n-propylaluminum monochloride (40 mmols), diethylene glycol dimethyl ether (0.10 mmol), the total amount of the above reaction product (H), the solid product (IV-1) (430 mg) and butene-1 (20 g), and the mixture was reacted together at 40° C. for 2 hours (reacted butene-1: 4.6 g per g of the solid product (IV-1)), followed by removing unreacted butene-1 and n-hexane under reduced pressure to obtain a preactivated catalyst in the form of powder. Successively, hydrogen (7,200 ml) wad fed and gas phase polymerization of propylene was carried out under a propylene partial pressure of 22 kg/cm$^2$G, at a polymerization temperature of 75° C. for 2 hours.

EXAMPLE 44

Example 45 was repeated except that ethyl p-anisate (0.5 mmol) was used in the preparation of the reaction product (H) ((H) molar ratio: 0.125, the amount of (H) formed: 0.55 g).

EXAMPLES 45 AND 46

Examples 43 and 44 were repeated except that the solid product (IV-2) was used in place of the solid product (IV-1).

EXAMPLES 47 AND 48

Propylene-ethylene copolymerizations were carried out as in Examples 41 and 42 except that in the polymerization, propylene (7 kg) and ethylene (95 g) were used in place of propylene monomer (7 kg) and the polymerization reaction was carried out at 60° C.

EXAMPLES 49 AND 50

Propylene-butene-1 copolymerizations were carried out as in Examples 47 and 48, using mixed α-olefins of propylene (7 kg) and butene-1 (800 g) in place of propylene (7 kg).

The results of the above Examples 41~50 are shown in Table 4.

TABLE 4

| Nos. of Examples | Polymer yield per g of TiCl$_3$— containing composition (g) | Isotactic index | IR-τ | Bending modulus ($\times 10^4$ kg/cm$^2$) | MFR |
|---|---|---|---|---|---|
| Ex. 41 | 10,500 | 99.2 | 0.93 | 1.20 | 3.4 |
| Ex. 42 | 11,200 | 99.0 | 0.89 | 0.95 | 3.3 |
| Ex. 43 | 8,500 | 99.0 | 0.93 | 1.20 | 3.1 |
| Ex. 44 | 8,700 | 98.5 | 0.89 | 0.95 | 3.3 |
| Ex. 45 | 5,100 | 98.8 | 0.92 | 1.15 | 3.1 |
| Ex. 46 | 5,120 | 98.5 | 0.88 | 0.90 | 3.2 |
| Ex. 47 | 10,800 | 98.0 | 0.89 | 0.90 | 3.1 |
| Ex. 48 | 11,300 | 97.5 | 0.85 | 0.83 | 3.2 |
| Ex. 49 | 10,500 | 98.5 | 0.90 | 1.00 | 3.2 |
| Ex. 50 | 11,200 | 98.0 | 0.86 | 0.90 | 3.3 |

It is apparent from the above Table that in each set of the experimental results consisting of two Examples, respectively, the IR-τ values of the resulting polypropylenes were different to a large extent according to the differences in the molar ratio of electron donors (C) to AlR$_3$ used in the preparation of the solid product (H), while the isotactic indexes were substantially unchanged.

Further, when the above Table is compared with Tables 1-3, it is apparent that the process of the present invention is applicable not only to the suspension polymerization of propylene, but to bulk polymerization, gas phase polymerization, bulk copolymerization of propylene-ethylene and bulk polymerization of propylene-butene-1.

EXAMPLE 51

Methyl p-toluylate (0.3 mmol) and triethylaluminum (0.3 mmol) were reacted together in n-pentane (50 ml) at 35° C. for 30 minutes to obtain a reaction product (H) ((H) molar ratio: 1.0). Diethylaluminum monochloride (10 mmols) was dissolved in n-pentane (80 ml), and to the resulting solution were added diethylene glycol dimethyl ether (0.05 mmol), the solid product (IV-1) (300 mg) and the total amount of the above reaction product (H), followed by reaction under a propylene partial pressure of 1.5 kg/cm$^2$G, at 30° C. for 20 minutes (reacted propylene per g of the solid product (IV-1): 10 g), and removing unreacted propylene and n-pentane under reduced pressure to obtain a preactivated catalyst in the form of powder. Butene-1 monomer (7 kg) was added to a reactor containing the above catalyst, and bulk polymerization of butene-1 was carried out at 70° C. for 3 hours. Fifteen grams of the resulting polymer was extracted in diethyl ether (500 ml) at its boiling point for 24 hours, followed by separating the polymer into ether-soluble and ether-insoluble, annealing the insoluble at 100° C. for 30 minutes, subjecting it to X-ray diffraction to give a X-ray crystallinity.

EXAMPLE 52

Example 51 was repeated except that methyl p-toluylate (0.15 mmol) was used in the preparation of the reaction product (H) ((H) molar ratio: 0.5, the amount of (H) formed: 57 mg).

EXAMPLE 53

Example 51 was repeated except that methyl p-toluylate (0.05 mmol) was used in the preparation of the reaction product (H) ((H) molar ratio: 0.17, the amount of (H) formed: 42 mg).

TABLE 5

| Nos. of Examples | Polymer yield per g of TiCl$_3$— containing composition (g) | Ether-soluble | X-ray crystallinity (%) |
|---|---|---|---|
| 51 | 10,400 | 2.1 | 68 |
| 52 | 12,300 | 2.2 | 60 |
| 53 | 13,000 | 2.4 | 56 |

What is claimed is:

1. A process for producing alpha-olefin polymers which comprises
   (1) producing a material either:
      (a) by reducing TiCl$_4$ with a metal of Group IIa or Group IIIb of the Periodic Table, and subjecting the resulting material to milling or heat treatment to produce a solid product I, or
      (b) by reducing TiCl$_4$ with either an organoaluminum compound or a reaction product of an organoaluminum compound with an electron donor to thereby produce a solid product III, or
      (c) by reducing a reaction product of TiCl$_4$ with an electron donor with either an organoaluminum compound or the reaction product of an organoaluminum compound with an electron donor to thereby produce a solid product V,
   (2) reacting solid product I or III or V with either
      (a) an electron donor (C), or
      (b) an electron acceptor (D), or
      (c) the reaction product (G) of an electron donor (C) with an electron acceptor (D),
      said reaction being carried out by milling reaction or suspension reaction, stepwise one to five times, said reaction resulting in solid product II or IV or VI respectively,
   (3) in a preactivating step combining the solid product (a titanium tri-chloride containing composition) resulting from step (2) with an organoaluminum compound (E) and preactivating the resulting combination with an alpha-olefin (F),
   (4) before, during, or after the preactivation, reacting the combination in step (3) with a reaction product (H) obtained by reacting one mole of a trialkylaluminum with 0.01 to 5 mols of an electron donor, the reaction of said combination with said reaction product being carried out at a temperature of 0° to 100° C. under a pressure of 0 to 10 kg/cm$^2$G for a period of one minute to 20 hours and the amount of said reaction product used in this reaction being 0.05 to 10 g based on 1 g of the titanium trichloride-containing composition contained in said combination; and (5) polymerizing an alpha-olefin or alpha-olefins in the presence of the preactivated catalyst resulting from step (4).

2. A process according to claim 1 wherein the solid product I or III or V obtained in said step (1) is subjected to a polymerization treatment with an alpha-olefin in the presence of an organoaluminum compound and the resulting solid product VII is subjected to said step (2).

3. A process according to claim 1 wherein said combination of said step (3) is reacted with an electron donor or an electron acceptor or a reaction product of an electron donor with an electron acceptor before, during or after said preactivation of said step (3) and the resulting solid product is subjected to said step (4).

4. A process according to claim 1 wherein in Step (1)(a) said metal is Mg or Al, and is used in an amount of 0.02 to 1 mol based on one mol of TiCl$_4$, and the reduction is carried out at 50° to 500° C. for 1 to 10 hours, followed by separating excess TiCl$_4$ and milling the resulting material with a ball mill or a vibration mill at 20° C. to 100° C. for 1 to 100 hours, or heat-treating the resulting material under an inert gas pressure of 5 to 0 kg/cm$^2$ or under a reduced or normal pressure of 0.01 to 760 mmHg, at 100° to 200° C. for 1 to 10 hours.

5. A process according to claim 1 wherein in step (1) (b) said organoaluminim compound is used in an amount of 0.05 to 10 mols based on one mol of TiCl$_4$, while in step (1)(c) there is used a reaction product obtained by reacting one mol of an organoaluminum compound with 0.05 to 10 mols of an electron donor, based on one mol of TiCl$_4$, and the reduction is carried out at $-30°$ C. to $+120°$ C. for 30 minutes to 10 hours, followed by separating excess TiCl$_4$.

6. A process according to claim 1 wherein in step (1) (c) said reaction product is that obtained by reacting one mol of TiCl$_4$ with 0.05 to 10 mols of an electron donor at $-10°$ to $+100°$ C. for 10 minutes to 5 hours, and the reduction is carried out by reacting the resulting reaction product with 0.05 to 10 mols of organoaluminum compound based on one mol of the titanium compound contained in said reaction product.

7. A process according to claim 1 wherein in step (1)(c) one mol of TiCl$_4$ is reacted with 0.05 to 10 mols of an electron donor at $-10°$ C. to $+100°$ C. for 10 minutes to 5 hours, and this reaction product is reduced by contacting it with a reaction product obtained by reacting one mol of an organoaluminum compound with 0.05 to 10 mols of an electron donor, both based on one mol of the titanium compound in said first reaction product at $-10°$ C. to $+100°$ C. for 10 minutes to 10 hours.

8. A process according to claim 2 wherein 100 g of a solid product obtained according to step (1) is combined with 5 to 500 g of an organoaluminum compound and the combination is subjected to a polymerization treatment with an alpha-olefin under a pressure of 0 to 10 kg/cm$^2$G in the presence of 10 to 1,000 ml of a solvent at 20° to 80° C. for 30 seconds to 5 hours with 1 to 1,000 g of said alpha-olefin being reacted followed by separating said solvent by filtration to obtain a polymerization-treated product, 100 g of which is then reacted with an electron donor or an electron acceptor or a reaction product of an electron donor with an electron acceptor each time in an amount of 1 to 1,000 g at $-50°$ to $+200°$ C. for 10 minutes to 10 hours.

9. A process according to claim 1 wherein in step (3) the solid product obtained in the step (2) is combined with 0 to 50 l of a solvent, 1 to 500 mmols of an organoaluminum compound, 0 to 30 Nl of hydrogen and 0.01 to 1,000 g of an alpha-olefin and the combination is preactivated at 0° to 100° C. under a pressure of 0 to 10 kg/cm$^2$G for one minute to 20 hours with 0.005 to 500 g of said alpha-olefin being reacted.

10. A process according to claim 3 wherein said combination of said step (3) is mixed with an electron donor or/and an electron acceptor or a reaction product of an electron donor with an electron acceptor in an amount of 0.05 to 10 mmols based on 1 g of the titanium trichloride-containing composition contained in said combination, and the mixture is reacted together at 0° to 100° C. under a pressure of 0 to 10 kg/cm$^2$G for one minute to 20 hours.

11. A process according to claim 1 wherein any of the organoaluminum compounds are expressed by the general formula AlR$_n$R'$_n$X$_{3-n}$ wherein R and R' each represent an alkyl group of 1 to 15 carbon atoms, an aryl group of 6 to 12 carbon atoms, an alkaryl group of 7 to 15 carbon atoms, a cycloalkyl group of 6 to 12 carbon atoms or an alkoxy group of 1 to 15 carbon atoms; X represents fluorine, chlorine, bromine or iodine; and n and n' each represent a number in a ratio of $0 < n + n' \leq 3$.

12. A process according to claim 2 wherein any one of the electron donors are one or more compounds selected from the group consisting of alcohols, ethers, esters, aldehydes, fatty acids, aromatic carboxylic acids, ketones, nitriles, amines, amides, ureas, thioureas, isocyanates, azo compounds, phosphines, phosphites, phosphinites, hydrogen sulfide, thioethers, and thioalcohols, organic compounds among the foregoing each containing 1 to 15 carbon atoms.

13. A process according to claim 1 wherein any of the electron donors are a siloxane polymer expressed by the general formula

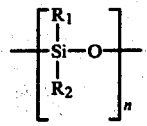

wherein R$_1$ and R$_2$ each represent one memeber selected from the group consisting of hydrogen, halogens, alkyls, aryls, alkoxy groups, aryloxy groups, and fatty acid residual groups, each having 1 to 10 carbon atoms; different kinds of R$_1$ and R$_2$ from each other may be present in different monomer units; and n represents a number in the range of 3 to 1,000.

14. A process according to claim 1 wherein said electron acceptor is a halide or halides of metals of Group III to Group VII of the Periodic Table.

15. A process according to claim 14 wherein said halide(s) are one member or more selected from the group consisting of anhydrous aluminum chloride, silicon tetrachloride, stannous chloride, stannic chloride, zirconium tetrachloride, phosphorus trichloride, phosphorus pentachloride, titanium tetrachloride, vanadium tetrachloride and antimony pentachloride.

16. A process according to claim 1 wherein said electron acceptor is iodine.

17. A process according to claim 1 wherein in step (1)(c) one mol of TiCl$_4$ is reacted with 0.05 to 10 mols of an electron donor in the presence of 0 to 5,000 ml of a solvent at −10° to +100° C., under a pressure of 0 to 2 kg/cm²G for 10 minutes to 5 hours.

18. A process according to claim 1 wherein in step (1) (b) one mol of an organoaluminum compound is reacted with 0.05 to 10 mols of an electron donor in the presence of 0 to 5,000 ml of a solvent, at −10° to +100° C., under a pressure of 0 to 2 kg/cm²G for 10 minutes to 10 hours.

19. A process according to claim 1 wherein said reaction product of an electron donor with an electron acceptor used in step (2)(c) is that obtained by reacting 100 g of an electron donor with 10 to 500 g of an electron acceptor at 0° to 80° C. under a pressure of 0 to 1 kg/cm²G for 10 minutes to 5 hours.

20. A process according to claim 1 wherein 100 g of a solid product obtained according to step (1)(a) followed by milling or heat treatment as set forth in (1)(a) is subjected to milling reaction with 1 to 50 g of an electron donor or an electron acceptor at 20° to 100° C. under a pressure of 0 to 2 kg/cm²G for 1 to 100 hours, by means of a ball mill or a vibration mill in said step (2).

21. A process according to claim 1 wherein 100 g of a solid product obtained according to step (1)(a) followed by milling or heat treatment as set forth in (1)(a) is reacted with 1 to 500 g of an electron donor or an electron acceptor in a suspension state in the presence of 0 to 2 l of a solvent at 20° to 200° C. under a pressure of 0 to 5 kg/cm²G for 10 minutes to 10 hours in said step (2).

22. A process according to claim 3 wherein 1 g of said titanium trichloride-containing composition of step (3) is mixed with 0.05 to 10 mmols of an electron donor and/or an electron acceptor or a reaction product of an electron donor with an electron acceptor, followed by reaction at 0° C. to 100° C. under a pressure of 0 to 10 kg/cm²G for one minute to 20 hours.

23. A process according to claim 1 wherein the alpha-olefins used in steps (3) and (5) are at least one member selected from the group consisting of ethylene, propylene, butene-1, hexene-1, octene-1, 4-methylpentene-1, 3-methylbutene-1, butadiene, isoprene and chloroprene.

24. A process according to claim 1 wherein the alpha-olefin used in step (5) is used together with styrene.

25. A process according to claim 1 wherein said alpha-olefin is subjected to slurry polymerization, bulk polymerization or gas phase polymerization in said step (5).

26. A process according to claim 1 wherein said alpha-olefin is subjected to slurry polymerization or bulk polymerization followed by gas phase polymerization in said step (5).

27. A process according to claim 1 wherein said alpha-olefin polymerization in said step (5) is carried out at room temperature (20° C.) to 200° C., under a pressure of 0 to 50 kg/cm²G for 5 minutes to 10 hours.

28. A process according to claim 1 wherein said alpha-olefin polymerization in said step (5) is carried out in the presence of hydrogen.

29. A process according to claim 19 wherein the reaction of a trialkylaluminum with an electron donor in the step (4) is carried out in n-pentane, n-hexane or n-heptane.

30. A process according to claim 21 wherein said solvent is one member or more selected from the group consisting of n-pentane, n-hexane, n-heptane, n-octane, i-octane, benzene, toluene, xylene, carbon tetrachloride, chloroform, 1,2-dichloroethane, methyl iodide, trichloroethylene, tetrachloroethylene, chlorobenzene, chlorotoluene, chloroxylene, chloroethylbenzene, dichlorobenzene and bromobenzene.

31. A process according to claim 8 wherein the solvents used in said step (2) are one member or more selected from the group consisting of propane, butane, n-pentane, n-hexane and n-heptane.

32. A process according to claim 9 wherein said solvent is one member or more selected from the group consisting of propane, butane, n-pentane, n-hexane, n-heptane, benzene, toluene, liquified propylene and liquified butene-1.

33. A process according to claim 1 wherein the polymerization of an alpha-olefin or alpha-olefins is carried out in n-hexane, n-heptane, liquified propylene or liquified butene.

* * * * *